(12) United States Patent
Bernstein et al.

(10) Patent No.: US 8,208,808 B2
(45) Date of Patent: Jun. 26, 2012

(54) DISTRIBUTED WAVELENGTH ASSIGNMENT USING SIGNALING PROTOCOLS IN WAVELENGTH SWITCHED OPTICAL NETWORKS

(75) Inventors: Greg Bernstein, Fremont, CA (US); Young Lee, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 935 days.

(21) Appl. No.: 12/186,775

(22) Filed: Aug. 6, 2008

(65) Prior Publication Data
US 2009/0110402 A1 Apr. 30, 2009

Related U.S. Application Data

(60) Provisional application No. 60/983,011, filed on Oct. 26, 2007.

(51) Int. Cl.
*H04J 14/00* (2006.01)

(52) U.S. Cl. ............... 398/48; 398/45; 398/49; 398/79; 398/50; 398/51; 398/57; 370/351; 370/352; 370/392; 370/389; 370/238

(58) Field of Classification Search ............ 398/45, 398/46, 47, 48, 49, 50, 51, 54, 56, 79, 34, 398/25, 17, 57, 58, 59, 7, 66, 67, 68, 69, 398/75, 33, 30, 31, 32, 8, 3, 4, 5, 6, 173, 398/175, 177, 181; 370/392, 401, 400, 352, 370/389, 465, 351, 355, 474, 223, 254, 225, 370/395.31, 238
See application file for complete search history.

(56) References Cited

U.S. PATENT DOCUMENTS

| | | | | |
|---|---|---|---|---|
| 6,987,754 B2 * | 1/2006 | Shahar et al. | ................. | 370/349 |
| 7,190,896 B1 * | 3/2007 | Wang et al. | ..................... | 398/30 |
| 7,899,326 B2 * | 3/2011 | Shi et al. | ......................... | 398/50 |

(Continued)

FOREIGN PATENT DOCUMENTS

CN 1791097 A 6/2006
(Continued)

OTHER PUBLICATIONS

Foreign Communication From a Related Counterpart Application—International Search Report and Written Opinion, PCT/CN2008/072845, Feb. 12, 2009, 6 pages.

(Continued)

*Primary Examiner* — Hanh Phan
(74) *Attorney, Agent, or Firm* — Conley Rose, P.C.; Grant Rudolph; Brandt Howell

(57) ABSTRACT

An apparatus comprising a first node configured to forward a wavelength assignment message to a second node, wherein the wavelength assignment message comprises a wavelength set type-length-value (TLV), a wavelength assignment method selection TLV, a supplemental wavelength assignment information TLV, a traffic parameter TLV, or combinations thereof. Also included is a network component comprising at least one processor configured to implement a method comprising obtaining a wavelength set data, a wavelength assignment method selection data, a supplemental wavelength assignment data, a traffic parameter data, or combinations thereof, and using at least one TLV to represent the obtained data. Also included is a method comprising obtaining a wavelength assignment information comprising a wavelength set, a supplemental wavelength assignment information, a wavelength assignment method selection, a traffic parameter, or combinations thereof, and forwarding the wavelength assignment information along a path.

19 Claims, 8 Drawing Sheets

U.S. PATENT DOCUMENTS

| | | | |
|---|---|---|---|
| 2003/0198227 | A1 | 10/2003 | Matsuura et al. |
| 2004/0249976 | A1* | 12/2004 | Neustadter et al. ........... 709/245 |
| 2009/0116836 | A1* | 5/2009 | Bernstein et al. ............... 398/51 |
| 2011/0081147 | A1* | 4/2011 | Lee et al. ......................... 398/48 |
| 2011/0081148 | A1* | 4/2011 | Lee et al. ......................... 398/48 |
| 2011/0091202 | A1* | 4/2011 | Lee et al. ........................... 398/7 |

FOREIGN PATENT DOCUMENTS

| | | |
|---|---|---|
| CN | 1897497 A | 1/2007 |
| CN | 101001475 A | 7/2007 |

OTHER PUBLICATIONS

Ash, J., et al., "Path Computation Element (PCE) Communication Protocol Generic Requirements", IETF Network Working Group, RFC 4657, Sep. 2006, 21 pgs.

Berger, L., "Generalized Multi-Protocol Label Switching (GMPLS) Signaling Functional Description", IETF Network Working Group, RFC 3471, Jan. 2003, 32 pgs.

Berger, L., "Generalized Multi-Protocol Label Switching (GMPLS) Signaling Resource Reservation Protocol-Traffic Engineering (RSVP-TE) Extensions", IETF Network Working Group, RFC 3473, Jan. 2003, 43 pgs.

Farrel, Ed A., et al., "Encoding of Attributes for Multiprotocol Label Switching (MPLS) Label Switching Path (LSP) Establishment Using Resource ReserVation Protocol-Traffic Engineering (RSVP-TE)," IETF Network Working Group, RFC 4420, Feb. 2006, 20 pgs.

Farrel, A., et al., "A Path Computation Element (PCE)—Based Architecture", IETF Network Working Group, RFC 4655, Aug. 2006, 38 pgs.

Mannie, E., et al., "Generalized Multi-Protocol Label Switching (GMPLS) Extensions for Synchronous Optical Network (SONET) and Synchronous Digital Hierarchy," IETF Network Working Group, RFC 4606, Aug. 2006, 24 pgs.

Moore, K., "Simple Mail Transfer Protocol (SMTP) Service Extension for Delivery Status notifications (DSNs)", IETF Network Working Group, RFC 3461, Jan. 2003, 36 pgs.

Otani, T., et al., "Generalized Labels of Lambda-Switching Capable Label Switching Routers (LSR)", work in progress: IETF Internet Draft, Updates: RFC 3471 (draft-otani-ccamp-gmpls-lambda-labels-00.txt), Jun. 2007, 10 pgs.

Papadimitriou, Ed D., "Generalized Multi-Protocol Label Switching (GMPLS) Signaling Extensions for G.709 Optical Transport Networks Control," IETF Network Working Group, RFC 4328, Jan. 2006, 22 pgs.

Bernstein, G., et al., "Framework for GMPLS and PCE Control of Wavelength Switched Optical Networks," IETF Network Working Group, Internet Draft, draft-bernstein-ccamp-wavelength-switched-01.txt, Sep. 13, 2007, 31 pages.

Xu, Sugang, et al., "Extensions to GMPLS RSVP-TE for Bidirectional Lightpath with the Same Wavelength," IETF Network Working Group, Internet Draft, draft-xu-rsvpte-bidir-wave-01, Nov. 12, 2007, 24 pages.

Lee, Y., et al., "Path Computation Element Communication Protocol (PCECP) Requirements and Protocol Extensions in Support of Global Concurrent Optimization," IETF Network Working Group, Internet Draft, draft-ietf-pce-global-concurrent-optimization-02.txt, Feb. 21, 2008, 28 pages.

Le Roux, J.L., et al., "Encoding of Objective Functions in the Path Computation Element Communication Protocol (PCEP)," IETF Network Working Group, Internet Draft, draft-ietf-pce-of-05.txt, Sep. 2008, 17 pages.

Vasseur, J.P., et al. "Path Computation Element (PCE) Communication Protocol (PCEP)", IETF Network Working Group, draft-ietf-pce-pcep-08.txt, Jul. 5, 2007, 49 pgs.

Zang, Hui, et al., "A Review of Routing and Wavelength Assignment Approaches for Wavelength-Routed Optical WDM Networks," Optical Networks Magazine, Jan. 2000, pp. 47-60.

ITU-T Draft Revised, Optical Transport Network Physical Layer Interfaces, Telecommunication Standardization Sector of ITU, Draft Revised Recommendation G.959.1, 55 pages.

ITU-T Recommendation G.694.1, "Spectral Grids for WDM Applications: DWDM Frequency Grid", Jun. 2002; 11 pgs.

Winzer, Peter J., et al., "Advanced Optical Modulation Formats," Proceedings of the IEEE, vol. 94, No. 5, May 2006, pp. 952-985.

Bradner, S.,"Key Words for Use IN RFCs to Indicate Requirement Levels," RFC 2119, Mar. 1997, 3 pages.

Otani, T., et. al., "Generalized Labels of Lamda-Switching Capable Label Switching Routers," draft-otani-ccamp-gmpls-lambda-labels-02.txt, Feb. 24, 2008, 11 pages.

Awduche, D., et. al., "RSVP-TE: Extensions to RSVP for LSP Tunnels," RFC 3209, Dec. 2001, 57 pages.

Kompella, K.,et. al., "Signalling Unnumbered Links in Resource Reservation Protocol-Traffic Engineering (RSVP-TE)," RFC 3477, Jan. 2003, 10 pages.

Farrel, A., et. al. "Encoding of Attributes for MPLS LSP Establishment Using Resource Reservation Protocol Traffic Engineering (RSVP-TE)," RFC 5420, Feb. 2009, 22 pages.

Bernstein, et al., Routing and Wavelength Assignment Information Encoding for Wavelength Switched Optical Networks, draft-bernstein-ccamp-wson-encode-00.txt, 42 pages, Jul. 3, 2008.

Xu, et al., "Extensions to GMPLS RSVP-TE for Bidirectional Lightpath with the Same Wavelength," draft-xu-rsvpte-bidir-wave-00.txt, Jun. 2007, 11 pages.

"Spectral Grids for WDM Applications: CWDM Wavelength Grid, Series G: Transmission Systems and Media, Digital Systems and Networks,Transmission Media Characteristics of Optical Components and Subsystems," ITU-T G.694.2, Dec. 2003, 12 Pages.

"Transport of IEEE 10G Base-R in Optical Transport Networks, Series G: Transmission Systems and Media, Digital Systems and Networks," ITU-T G.Supp. 43, Nov. 2006, 18 pages.

Lang, J., et. al. "RSVP-TE Extensions in Support of End-to-End Generalized Multi-Protocol Label Switching (GMPLS) Recovery," RFC 4872, May 2007, 48 pages.

Bernstien, G., et. al., "Framework for GMPLS and PCE Control of Wavelength Switched Optical Networks" draft-bernstein-ccamp-wavelength-switched-03.txt, 34 pages, Feb. 19, 2008.

Bernstien, G., et. al., "Framework for GMPLS and PCE Control of Wavelength Switched Optical Networks" draft-bernstein-ccamp-wavelength-switched-02.txt, Oct. 25, 2007, 68 pages.

Mannie, E. et. al., "Recovery (Protection and Restoration) Terminology for Generalized Multi-Protocol Label Switching (GMPLS)," RFC 4427, Mar. 2006, 23 pages.

"Interfaces for the Optical Transport Network (OTN), Series G: Transmission Systems and Media, Digital Systems and Networks, Digital Terminal Equipments-General," ITU-T G.709/Y.1331, Mar. 2003, 218 pages.

"Forward Error Correctuion for High Bit Rate DWDM Submarine Systems, Series G: Transmission Systems and Media, Digital Systems and Networks, Digital Sections and Digital Line System-Optical Fibre Submarine Cable Systems," ITU-T G.975.1,Feb. 2004, 58 pages.

Andriolli, N., et al., "Label preference Schemes in GMPLS Controlled Networks," IEEE Communication Letters, Dec. 12, 2006, 3 pages.

Ji, Y. et al., "MSWS Method to Support Shared-Mesh Restoration for Wavelength Switch Optical Networks" draft-ji-ccamp-wson-msws-00.txt, Jan. 29, 2008, 13 pages.

McCloghrie, et al., "Structure of Management Information Version 2 (SMIv2)," RFC 2578, Apr. 1999, 43 pages.

Bernstein, Ed., et al., "Framework for GMPLS and PCE Control of Wavelength Switched Optical Networks (WSON)," draft-ietf-ccamp-wavelength-switched-framework-00.txt, May 13, 2008, 68 pages.

Otani, Ed., "Generalized Labels for G.694 Lambda-Switching Capable Label Switching Routers," draft-ietf-ccamp-gmpls-g-694-lambda-labels-02.txt, Jul. 14, 2008, 11 pages.

\* cited by examiner

DISTRIBUTED WAVELENGTH ASSIGNMENT USING SIGNALING PROTOCOLS IN WAVELENGTH SWITCHED OPTICAL NETWORKS

CROSS-REFERENCE TO RELATED APPLICATIONS

The present application claims priority to U.S. Provisional Patent Application Ser. No. 60/983,011 filed Oct. 26, 2007 by Bernstein et al. and entitled "Method for Distributed Wavelength Assignment Using Modern Signaling Protocols in Wavelength Switched Optical Networks," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wavelength division multiplexing (WDM) is one technology that is envisioned to increase bandwidth capability and enable bidirectional communications in optical networks. In WDM networks, multiple data signals can be transmitted simultaneously between network elements (NEs) using a single fiber. Specifically, the individual signals may be assigned different transmission wavelengths so that they do not interfere or collide with each other. The path that the signal takes through the network is referred to as the lightpath. One type of WDM network, a wavelength switched optical network (WSON), seeks to switch the optical signals with fewer optical-electrical-optical (OEO) conversions along the lightpath, e.g. at the individual NEs, than existing optical networks.

One of the challenges in implementing WDM networks is the determination of the routing and wavelength assignment (RWA) for the various signals that are being transported through the network at any given time. The RWA may be implemented in a single step or in two separate steps comprising routing or path assignment and wavelength assignment (WA). When implemented separately, the path assignment may be implemented by a path computation element (PCE) while the WA may be distributed among the NEs along the path using a signaling protocol and a wavelength selection scheme.

SUMMARY

In one embodiment, the disclosure includes an apparatus comprising a first node configured to forward a wavelength assignment message to a second node, wherein the wavelength assignment message comprises a wavelength set type-length-value (TLV), a wavelength assignment method selection TLV, a supplemental wavelength assignment information TLV, a traffic parameter TLV, or combinations thereof.

In another embodiment, the disclosure includes a network component comprising at least one processor configured to implement a method comprising obtaining a wavelength set data, a wavelength assignment method selection data, a supplemental wavelength assignment data, a traffic parameter data, or combinations thereof, and using at least one TLV to represent the obtained data.

In yet another embodiment, the disclosure includes a method comprising obtaining a wavelength assignment information comprising a wavelength set, a supplemental wavelength assignment information, a wavelength assignment method selection, a traffic parameter, or combinations thereof, and forwarding the wavelength assignment information along a path.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system and method for forwarding wavelength assignment information for distributed WA between a plurality of NEs along a path. Specifically, the wavelength assignment information may be forwarded using at least a message or a data block, such as a TLV. The wavelength assignment information may comprise a wavelength set that indicates at least one available wavelength, a wavelength assignment method selection that indicates a wavelength selection scheme, a supplemental wavelength assignment information that may be used for selecting an available wavelength, a traffic parameter that indicates optical signal characteristics, or combinations thereof. The wavelength assignment information may be combined, organized, or compressed before being forwarded along the path.

Figure 1:
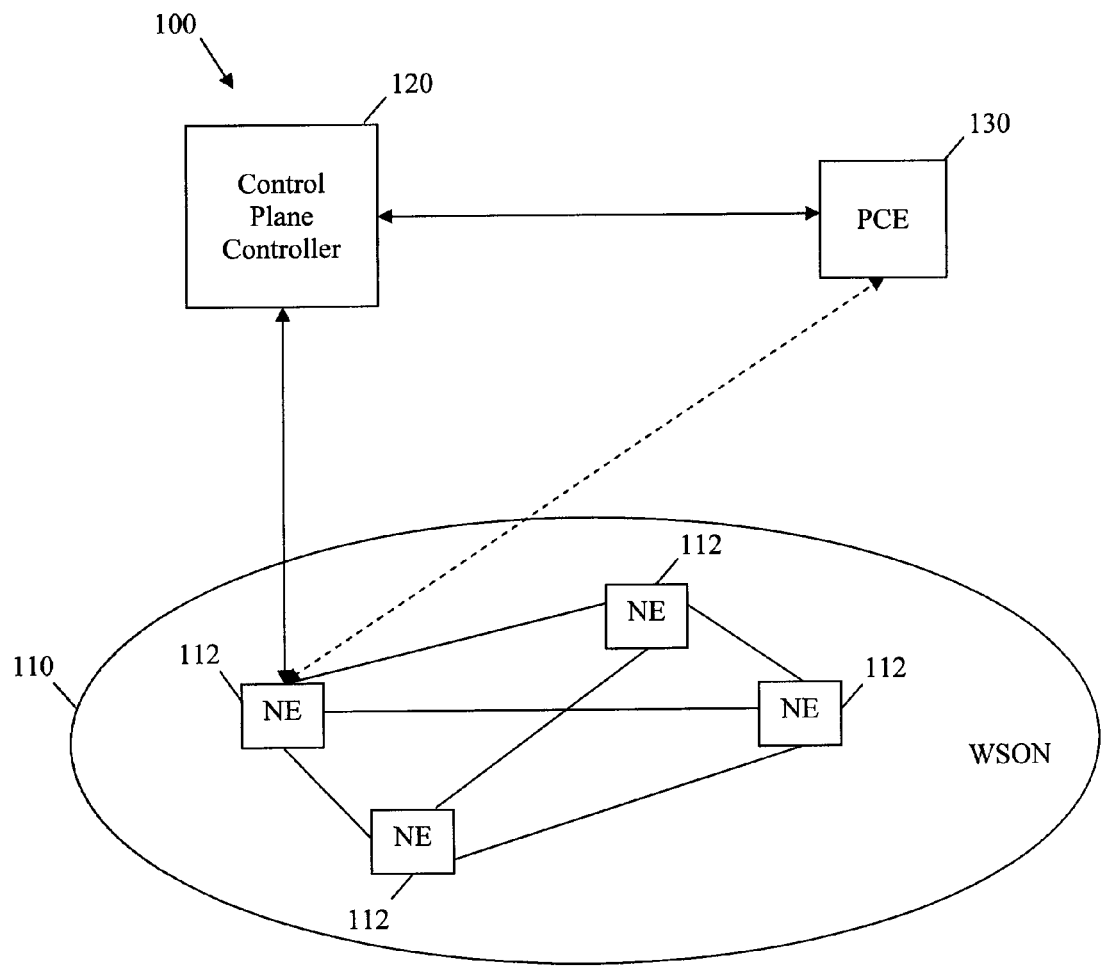
FIG. 1 is a schematic diagram of an embodiment of a WSON system.

FIG. 1 illustrates one embodiment of a WSON system 100. The system 100 may comprise a WSON 110, a control plane controller 120, and a PCE 130. The WSON 110, control plane controller 120, and PCE 130 may communicate with each other via optical, electrical, or wireless means. The WSON 110 may comprise a plurality of NEs 112 coupled to one another using optical fibers. In an embodiment, the optical fibers may also be considered NEs 112. The optical signals may be transported through the WSON 110 over lightpaths that may pass through some of the NEs 112. In addition, some of the NEs 112, for example those at the ends of the WSON 110, may be configured to convert between electrical signals from external sources and the optical signals used in the WSON 110. Although four NEs 112 are shown in the WSON 110, the WSON 110 may comprise any number of NEs 112.

The WSON 110 may be any optical network that uses active or passive components to transport optical signals. The WSON 110 may implement WDM to transport the optical signals through the WSON 110, and may comprise various optical components as described in detail below. The WSON 110 may be part of a long haul network, a metropolitan network, or a residential access network.

The NEs 112, also referred to as nodes, may be any devices or components that transport signals through the WSON 110. In an embodiment, the NEs 112 consist essentially of optical processing components, such as line ports, add ports, drop ports, transmitters, receivers, amplifiers, optical taps, and so forth, and do not contain any electrical processing components. Alternatively, the NEs 112 may comprise a combination of optical processing components and electrical processing components. At least some of the NEs 112 may be configured with wavelength converters, optical-electrical (OE) converters, electrical-optical (EO) converters, OEO converters, or combinations thereof. However, it may be advantageous for at least some of the NEs 112 to lack such converters as such may reduce the cost and complexity of the WSON 110. In specific embodiments, the NEs 112 may comprise optical cross connects (OXCs), photonic cross connects (PXCs), type I or type II reconfigurable optical add/drop multiplexers (ROADMs), wavelength selective switches (WSSs), fixed optical add/drop multiplexers (FOADMs), or combinations thereof.

The NEs 112 may be coupled to each other via optical fibers, also referred to as links. The optical fibers may be used to establish optical links and transport the optical signals between the NEs 112. The optical fibers may comprise standard single mode fibers (SMFs) as defined in the International Telecommunication Union (ITU) Telecommunication Standardization Sector (ITU-T) standard G.652, dispersion shifted SMFs as defined in ITU-T standard G.653, cut-off shifted SMFs as defined in ITU-T standard G.654, non-zero dispersion shifted SMFs as defined in ITU-T standard G.655, wideband non-zero dispersion shifted SMFs as defined in ITU-T standard G.656, or combinations thereof. These fiber types may be differentiated by their optical impairment characteristics, such as attenuation, chromatic dispersion, polarization mode dispersion, four wave mixing, or combinations thereof. These effects may be dependent upon wavelength, channel spacing, input power level, or combinations thereof. The optical fibers may be used to transport WDM signals, such as course WDM (CWDM) signals as defined in ITU-T G.684.2 or dense WDM (DWDM) signals as defined in ITU-T G.684.1. All of the standards described herein are incorporated herein by reference.

The control plane controller 120 may coordinate activities within the WSON 110. Specifically, the control plane controller 120 may receive optical connection requests and provide lightpath signaling to the WSON 110 via, for example, a Generalized Multi-Protocol Label Switching (GMPLS), thereby coordinating the NEs 112 such that data signals are routed through the WSON 110 with little or no contention. In addition, the control plane controller 120 may communicate with the PCE 130 using PCE Protocol (PCEP), provide the PCE 130 with information that may be used for the RWA, receive the RWA from the PCE 130, and/or forward the RWA to the NEs 112. The control plane controller 120 may be located in a component outside of the WSON 110, such as an external server, or may be located in a component within the WSON 110, such as a NE 112.

The PCE 130 may perform all or part of the RWA for the WSON system 100. Specifically, the PCE 130 may receive the wavelength or other information that may be used for the RWA from the control plane controller 120, from the NEs 112, or both. The PCE 130 may process the information to obtain the RWA, for example, by computing the routes, e.g. lightpaths, for the optical signals, specifying the optical wavelengths that are used for each lightpath, and determining the NEs 112 along the lightpath at which the optical signal should be converted to an electrical signal or a different wavelength. The RWA may include at least one route for each incoming signal and at least one wavelength associated with each route. The PCE 130 may then send all or part of the RWA information to the control plane controller 120 or directly to the NEs 112. To assist the PCE 130 in this process, the PCE 130 may comprise a global traffic-engineering database (TED), a RWA information database, an optical performance monitor (OPM), a physical layer constraint (PLC) information database, or combinations thereof. The PCE 130 may be located in a component outside of the WSON 110, such as an external server, or may be located in a component within the WSON 110, such as a NE 112.

In some embodiments, the RWA required information may be sent to the PCE 130 by a path computation client (PCC). The PCC may be any client application requesting a path computation to be performed by the PCE 130. The PCC may also be any network component that makes such a request, such as the control plane controller 120, or any NE 112, such as a ROADM or a FOADM.

Figure 2:
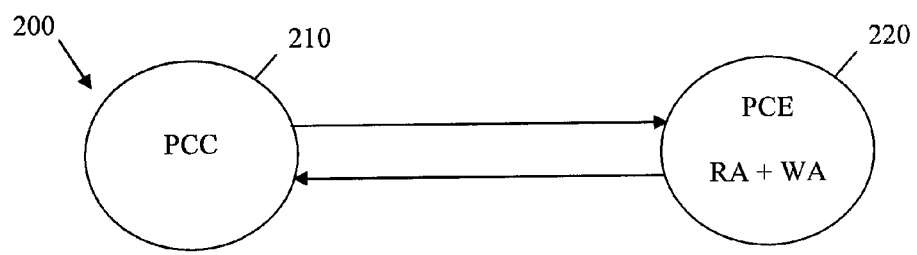
FIG. 2 is a schematic diagram of an embodiment of a combined RWA architecture.

FIG. 2 illustrates an embodiment of a combined RWA architecture 200. In the combined RWA architecture 200, the PCC 210 communicates the RWA request and the required information to the PCE 220, which implements both the routing assignment and the wavelength assignment functions using a single computation entity, such as a processor. For example, the processor may process the information using a single or multiple algorithms to compute the lightpaths as well as to assign the optical wavelengths for each lightpath. The amount of information needed by the PCE 220 to compute the RWA may vary depending on the algorithm used. If desired, the PCE 220 may not compute the RWA until sufficient network links are established between the NEs or when sufficient information about the NEs and the network topology is provided. The combined RWA architecture 200 may be preferable for network optimization, smaller WSONs, or both.

Figure 3:
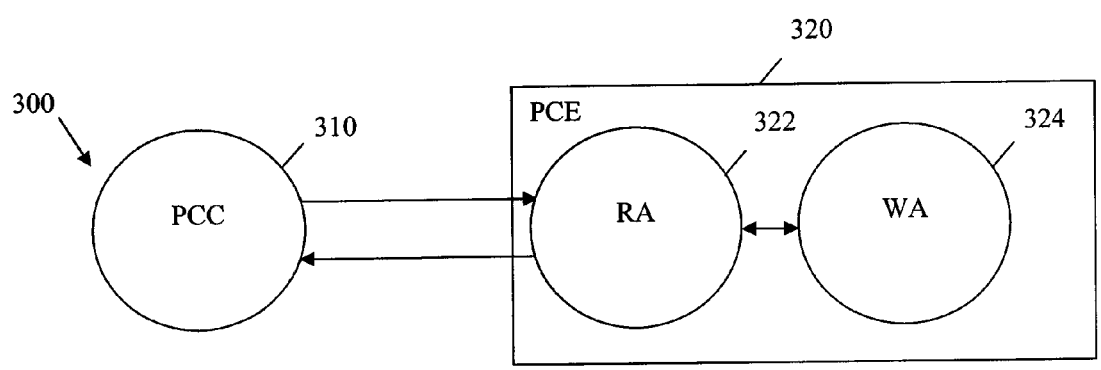
FIG. 3 is a schematic diagram of an embodiment of a separated RWA architecture.

FIG. 3 illustrates an embodiment of a separated RWA architecture 300. In the separated RWA architecture 300, the PCC 310 communicates the RWA request and the required information to the PCE 320, which implements both the routing function and the wavelength assignment function using separate computation entities, such as processors 322 and 324. Alternatively, the separated RWA architecture 300 may comprise two separate PCEs 320 each comprising one of the processors 322 and 324. Implementing routing assignment and wavelength assignment separately may offload some of the computational burden on the processors 322 and 324 and reduce the processing time. In an embodiment, the PCC 310 may be aware of the presence of only one of two processors 322, 324 (or two PCEs) and may only communicate with that processor 322, 324 (or PCE). For example, the PCC 310 may send the RWA required information to the processor 322, which may compute the lightpath routes and forward the routing assignment to the processor 324 where the wavelength assignments are performed. The RWA may then be passed back to the processor 322 and then to the PCC 310. Such an embodiment may also be reversed such that the PCC 310 communicates with the processor 324 instead of the processor 322.

In either architecture 200 or 300, the PCC may receive a route from the source to destination along with the wavelengths, e.g. GMPLS generalized labels, to be used along portions of the path. The GMPLS signaling supports an explicit route object (ERO). Within an ERO, an ERO label sub-object can be used to indicate the wavelength to be used at a particular NE. In cases where the local label map approach is used, the label sub-object entry in the ERO may have to be translated. In an embodiment, the ERO may comprise a lambda label that indicates a primary or first wavelength from a list or range of wavelengths to be assigned to at least one NE or at least one link.

Figure 4:
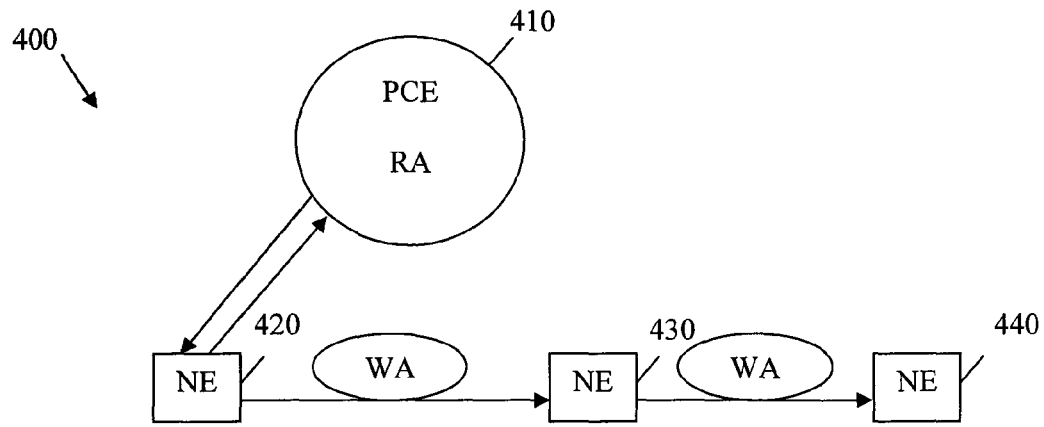
FIG. 4 is a schematic diagram of an embodiment of a distributed RWA architecture.

FIG. 4 illustrates a distributed wavelength assignment architecture 400. In the distributed wavelength assignment architecture 400, the PCE 410 may receive some or all of the RWA information from the NEs 420, 430, and 440, perhaps via direct link, and implements the routing assignment. The PCE 410 then directly or indirectly passes the routing assignment to the individual NEs 420, 430, and 440, which assign the wavelengths at the local links between the NEs 420, 430, and 440 based on wavelength assignment information, local information, or both. At least some of the wavelength assignment information may be forwarded from the PCE, from at least some of the NEs, or both.

For instance, the NE 420 may obtain the RWA required information locally and from the NEs 430 and 440 and forward some or all the information to the PCE 410. The PCE 410 may compute the lightpaths using the received information and send the list of lightpaths to the NE 420. The NE 420 may receive and use the list of lightpaths to identify the NE 430 as the next NE in the lightpath and hence establish a link to the NE 430. The NE 420 may use the wavelength assignment information to assign a wavelength for transmission over the link. The NE 430 may then forward the list of lightpaths to the NE 430 in addition to some of the wavelength assignment information, which may be updated by the NE 430. The NE 430 may receive the list of lightpaths from the NE 420 and the wavelength assignment information. The NE 430 may use the list of lightpaths to identify the NE 440 as the next NE in the lightpath and establish a link to the NE 440. The NE 430 may use the wavelength assignment information to assign the same or a different wavelength for transmission over the link. Thus, the signals may be routed and the wavelengths may be assigned in a distributed manner between the remaining NEs in the network. Assigning the wavelengths at the individual NEs may reduce the amount of information by the PCE 410 for RWA.

Figure 5:
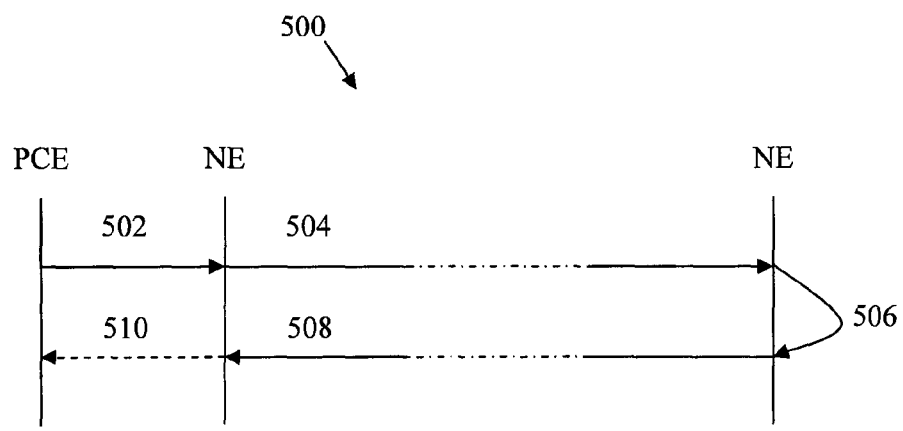
FIG. 5 is a protocol diagram of an embodiment of distributed WA communications.

FIG. 5 illustrates an embodiment of a distributed wavelength assignment communications method 500 between a plurality of NEs. The method 500 may be implemented using any suitable signaling protocol, such as GMPLS, or similar messaging protocol to exchange information between the NEs. In the method 500, the PCE may receive a path computation request from an NE or other PCC (not shown). The request may include lightpath constraints such as a RWA computation option, a route parameter, a wavelength selection preference, an optimization degree, a timeliness characteristic, a duration, or combinations thereof. The PCE may calculate or locate a path through the network that meets the lightpath constraints.

For instance, the PCE may calculate a path comprising a plurality of NEs coupled to each other via a plurality of links. The PCE may send a message comprising the routing assignment, such as a path computation reply 502, to the first or source NE in the calculated path. In some embodiments, the path computation reply 502 may comprise an initial or suggested wavelength assignment information, which may be used, updated or changed when implementing distributed wavelength assignment among the NEs. Upon receiving the path computation reply 502, the first or source NE may implement a distributed wavelength assignment with the other NEs in the path. Specifically, the NEs may each forward, one at a time, a path message 504 comprising updated wavelength assignment information in addition to the routing assignment. The message 504 may comprise at least one of the TLVs described below. As used herein, the term TLV may refer to any data structure that carries wavelength availability or assignment information. The last or destination NE in the path may receive the path message 504, assign a wavelength to at least a portion of the path, and send back a reserve message 508 comprising the wavelength assignment to the previous NEs. The reserve message 508 may also comprise any of the TLVs described herein.

In the case where no wavelength can be assigned to the path, for example when no common wavelength is available at all the NEs, the destination NE or any other NE making such a determination may send back a path error message to the previous NEs or hops to inform the NEs that the distributed wavelength assignment is blocked. Additionally, the source NE or node may send a confirmation message 510 to the PCE to inform the PCE whether a path wavelength assignment has been established or blocked.

The wavelength assignment information may comprise wavelength related information that may be used to assign at least one wavelength at the individual NEs along an assigned path. The wavelength assignment information may be obtained locally at the individual NEs. Alternatively, the wavelength assignment information may be received from the previous NEs along the path. In other embodiments, the wavelength assignment information may be obtained by combining local information at the individual NEs and received information from the previous NEs along the path.

The wavelength assignment information may comprise a wavelength set, a wavelength assignment method selection, a supplemental wavelength assignment information, a traffic parameter, or combinations thereof. The wavelength set may represent at least one wavelength, which may be available or assigned at the previous NEs along the path, locally at the individual NEs, or both. The wavelength assignment method selection may specify the assignment or selection scheme or algorithm that may be implemented to assign a wavelength. The supplemental wavelength assignment information may be used to indicate which wavelength or wavelengths may be assigned. The traffic parameter may represent at least a signal characteristic or property associated with an optical signal that may be assigned a wavelength.

FIGS. 6-9 illustrate embodiments of a wavelength set TLVs that may be used to forward a wavelength set between a plurality of NEs along a path. Specifically, the wavelength set may be used to represent at least one wavelength or wavelength channel that is available or assigned to at least one link or node.

Figure 6:
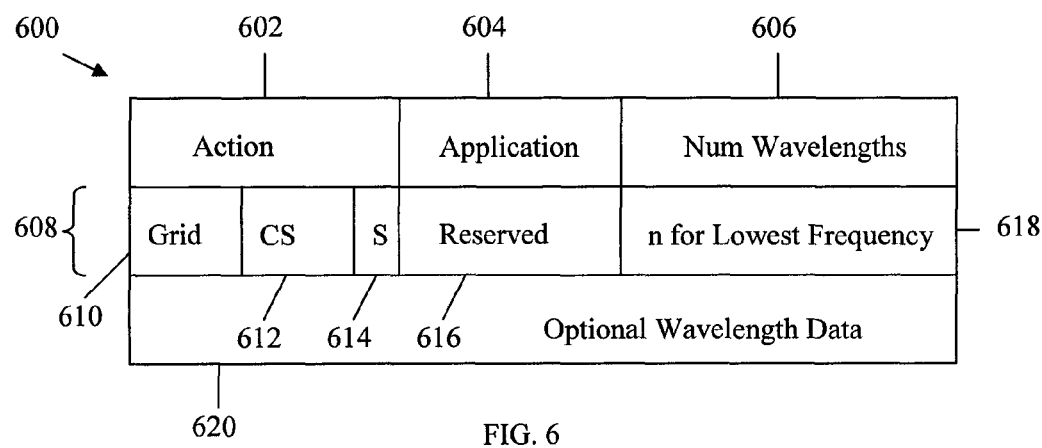
FIG. 6 is a schematic diagram of an embodiment of a wavelength set TLV.

FIG. 6 illustrates one embodiment of a wavelength set TLV 600. The wavelength set TLV 600 may be used to encode at least one type of wavelength set discussed below when the wavelength assignment information is associated with at least one node, link, and/or wavelength. The TLV 600 may comprise an action field 602. The action field 602 may comprise the first about eight bits of the TLV 600, and may provide information regarding the wavelength(s) identified in a lambda label 608 and an optional wavelength data 620, both of which are described below. For example, when the action field 602 is set to zero, the lambda label 608 and the wavelength data 620 may represent an inclusive list in that the wavelengths identified in the lambda label 608 and the wavelength data 620 are the only wavelengths in the wavelength set. Similarly, when the action field 602 is set to one, the lambda label 608 and the wavelength data 620 may represent an exclusive list in that the wavelengths identified in the lambda label 608 and the wavelength data 620 are the only wavelengths that are excluded from the wavelength set. In contrast, when the action field 602 is set to two, the lambda label 608 may represent an inclusive range in that the lambda label 608 identifies the first wavelength and the total number of wavelengths that are included in the wavelength set. Moreover, when the action field 602 is set to three, the lambda label 608 may represent an exclusive range in that the lambda label 608 identifies the first wavelength and the total number of wavelengths that are excluded from the wavelength set. Finally, when the action field 602 is set to four, the lambda label 608 and the wavelength data 620 may define the wavelength set using a bitmap, where the wavelength data 620 is a bitmap indicating which wavelengths are included in the wavelength set and the lambda label 608 identifies the first wavelength in the bitmap. In any event, the lambda label 608 may identify one wavelength in the wavelength set and provide the information needed to determine the remaining wavelengths in the wavelength set.

The TLV 600 may also comprise an application field 604 and a number of wavelengths (num wavelengths) field 606. The application field 604 may comprise the subsequent about eight bits of the TLV 600, and may be used for other purposes. The num wavelengths field 606 may comprise the subsequent about 16 bits of the TLV 600, and may indicate the quantity of wavelengths in the wavelength data 620, e.g. when the action field 602 is set to zero or one. In such cases, the quantity of wavelengths in the wavelength set may be one more than the quantity of wavelengths in the wavelength data 620 because the lambda label 608 comprises the first wavelength in the wavelength set. Alternatively, the num wavelengths field 606 may indicate the quantity of wavelengths in the wavelength set.

The TLV 600 may also comprise a lambda label 608 and an optional wavelength data 620. The lambda label 608 may be used to represent at least one wavelength in a standardized wavelength grid, such as DWDM or CWDM described above. The lambda label 608 may comprise a grid field 610, a channel spacing (CS) field 612, a sign (S) field 614, a reserved field 616, and a number (n) field 618. The grid field 610 may comprise the subsequent about four bits of the TLV 600, and may indicate the WDM grid specification is being used. For example, the grid field 610 may be set to one to indicate an ITU-T DWDM wavelength grid, or the grid field 610 may be set to two to indicate an ITU-T CWDM wavelength grid. The CS field 612 may comprise the subsequent about four bits of the TLV 600, and may indicate the spacing between the wavelength channels. For example, the CS field 612 may be set to one to indicate a channel spacing of about 12.5 gigahertz (GHz), the CS field 612 may be set to two to indicate a channel spacing of about 25 GHz, or the CS field 612 may be set to three to indicate a channel spacing of about 50 GHz. Alternatively, the CS field 612 may be set to four to indicate a channel spacing of about 100 GHz, or the CS field 612 may be set to five to indicate a channel spacing of about 200 GHz. The S field 614 may comprise the subsequent about one bit of the TLV 600, and may indicate the sign used to offset from the center frequency. For example, the S field 614 may be set to zero to indicate a positive (+) sign, or the S field 614 may be set to one to indicate a negative (−). The reserved field 616 may comprise the subsequent about eight bits of the TLV 600, and may be used for other purposes. The n field 618 may be about the subsequent 16 bits, and may be used to specify a specific frequency or wavelength. For example, n may be an integer used to specify a frequency using the formula:

$$\text{Frequency} = 183.1 \text{ terahertz(THz)} \pm n^* (\text{channel spacing})$$

where the ± is selected based on the sign in the S field 614 and the channel spacing is defined in the CS field 612. More information on the lambda label 608 can be found in Otani, et al., *Generalized Labels of Lambda-Switching Capable Label Switching Routers (LSR)*, IETF RFC 3461, draft-otani-ccamp-gmpls-lambda-labels-02.txt, December 2006, which is incorporated herein by reference as if reproduced in its entirety. The wavelength data 620 may be optional and may be included if needed to specify the wavelength set. Specifically, the wavelength data 620 may comprise at least one wavelength when the action field 602 is set to zero or one and the num wavelengths field 606 is greater than or about equal to two. Alternatively, the wavelength data 620 may comprise a bitmap when the action field 602 is set to four. When the num wavelengths field 606 ends with less than a full 32-bit word, the remaining bits, e.g. up to the $32^{nd}$ bit, may be filled with zeros (zero padded). In some cases, the wavelengths in the num wavelengths field 606 are unimportant such that the wavelengths may be arranged in any order.

Figure 7:
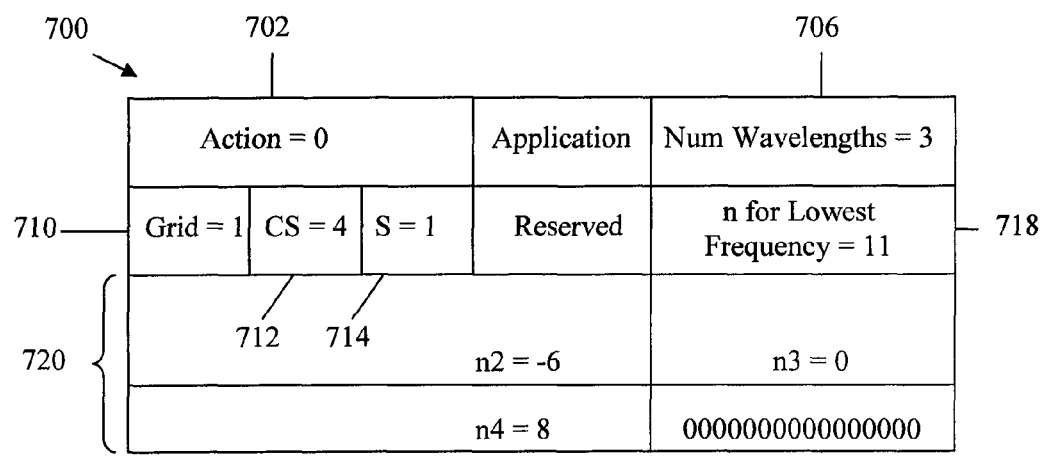
FIG. 7 is a schematic diagram of an embodiment of a wavelength list TLV.

FIG. 7 is an example of a wavelength set TLV 700 that illustrates the inclusive list embodiment. The action field 702 is set to zero, which may indicate that the TLV 700 contains an inclusive list of wavelengths that make up the wavelength set. The num wavelengths field 706 is set to three, which may indicate that there are three wavelengths in the wavelength data 720. The grid field 710 is set to one, which may indicate that the ITU-T DWDM grid is being used. The CS field 712 is set to four, which may indicate a channel spacing of 100 GHz. The S field 714 is set to one, which may indicate a negative sign. The n field 718 may be set to eleven, which may indicate that 182.0 THz is the lowest frequency in the set (calculated by 183.1 THz−11*(100 GHz)). The wavelength data 720 comprises the numbers negative six, zero, and eight, which may correspond to frequencies 182.5 THz (calculated by 183.1 THz−6*(100 GHz)), 183.1 THz (calculated by 183.1 THz+0*(100 GHz)), and 183.8 THz (calculated by 183.1

THz+8*(100 GHz)). The remainder of the TLV 700 is zero padded. Thus, the TLV 700 may indicate that the wavelength set consists of 182.0 THz, 182.5 THz, 183.1 THz, and 183.8 THz.

Figure 8:
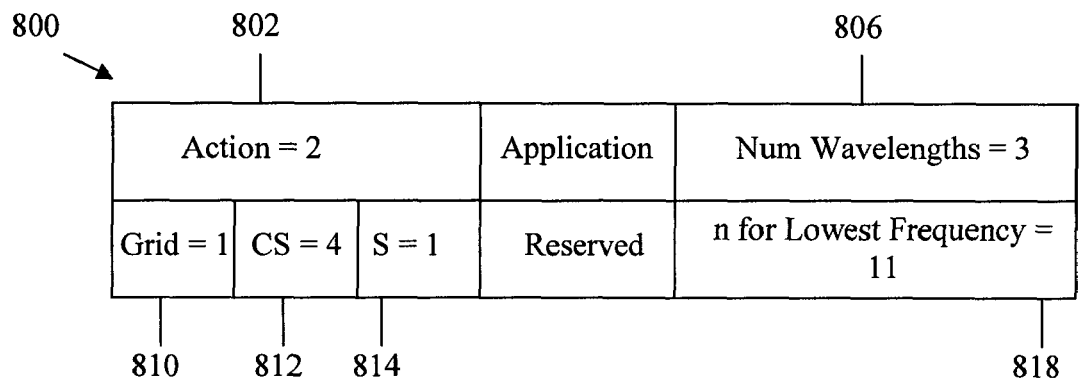
FIG. 8 is a schematic diagram of an embodiment of a wavelength range TLV.

FIG. 8 is an example of a wavelength set TLV 800 that illustrates the inclusive range embodiment. The action field 802 is set to two, which may indicate that the TLV 800 contains an inclusive range of wavelengths that make up the wavelength set. The num wavelengths field 806 is set to three, which may indicate that there are three wavelengths in the wavelength set. The grid field 810 is set to one, which may indicate that the ITU-T DWDM grid is being used. The CS field 812 is set to four, which may indicate a channel spacing of 100 GHz. The S field 814 is set to one, which may indicate a negative sign. The n field 818 may be set to eleven, which may indicate that 182.0 THz is the lowest frequency in the set (calculated by 183.1 THz−11*(100 GHz)). The remaining wavelengths in the set may be determined by incrementing the lowest wavelength by the channel spacing, and repeating the incrementing process the number of times specified in the num wavelengths field 806. Thus, the TLV 800 may indicate that the wavelength set consists of 182.0 THz, 182.1 THz, and 182.2 THz.

Figure 9:
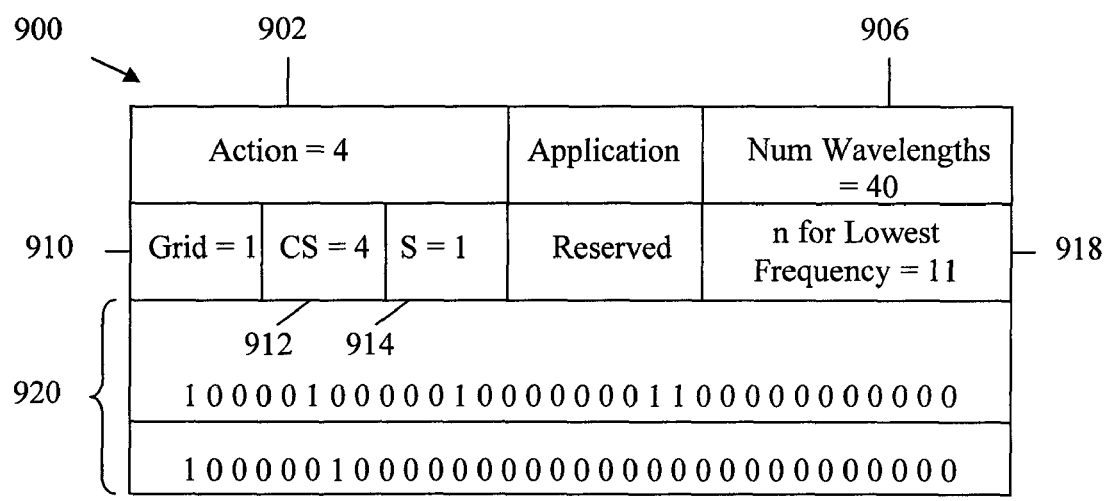
FIG. 9 is a schematic diagram of an embodiment of a wavelength bitmap TLV.

FIG. 9 is an example of a wavelength set TLV 900 that illustrates a bitmap embodiment. The action field 902 is set to four, which may indicate that the TLV 900 contains a bitmap that indicates the wavelength set. The num wavelengths field 906 is set to 40, which may indicate that there are 40 wavelengths represented in the bitmap. The grid field 910 is set to one, which may indicate that the ITU-T DWDM grid is being used. The CS field 912 is set to four, which may indicate a channel spacing of 100 GHz. The S field 914 is set to one, which may indicate a negative sign. The n field 918 may be set to eleven, which may indicate that 192.0 THz is the lowest frequency in the set (calculated by 193.1 THz−11*(100 GHz)). The bitmap 920 contains ones at the following locations: 0, 5, 11, 19, 20, 32, and 38, and the remaining bitmap locations contain zeros. The bitmap 920 values correspond to n values of −11, −6, 0, 8, 9, 21, and 27, respectively. Thus, the TLV 900 may indicate that the wavelength set consists of 192.0 THz, 192.5 THz, 193.1 THz, 193.9 THz, 194.0 THz, 195.2 THz, and 195.8 THz. The remaining portion of the TLV 900 has been filled with zeros.

Figure 10:
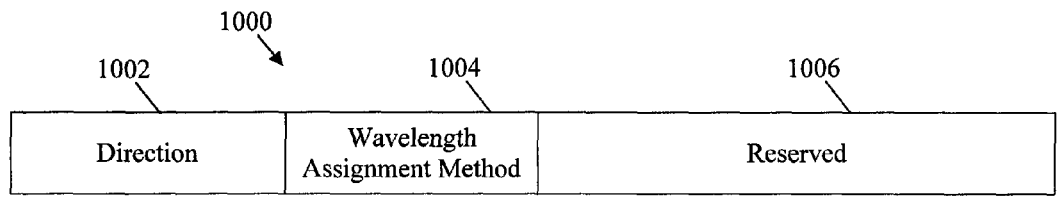
FIG. 10 is a schematic diagram of an embodiment of a wavelength assignment method selection TLV.

FIG. 10 illustrates an embodiment of a wavelength assignment method selection TLV 1000, which may be used to forward a wavelength assignment method selection between a plurality of NEs along a path. The wavelength assignment method selection may be used to represent a wavelength assignment direction, a wavelength assignment method, or both. Specifically, the wavelength assignment method selection TLV 1000 may comprise a direction field 1002, a wavelength assignment method field 1004, a reserved field 1006, or combinations thereof. In an embodiment, the direction field 1002 and the wavelength assignment method field 1004 may each be about eight bits long, while the reserved field 1006 may be about 16 bits long.

The direction field 1002 may be the first field in the TLV 1000, and may indicate whether a wavelength may be assigned in one direction or two directions across a link. The two directions may be opposite or reverse directions. In embodiments, the path may be assigned a wavelength along a downstream direction, e.g. towards a subsequent node along the path, or along an upstream direction, e.g. towards a previous node along the path, or in along both the downstream and upstream directions, e.g. from the node to the subsequent node and to the previous node along the path. For instance, the direction field 1002 may be set to zero when the wavelength is assigned to one direction that may be either a downstream direction or an upstream direction. Alternatively, the direction field 1002 may be set to one when the wavelength is assigned to both upstream and downstream directions.

The wavelength assignment method field 1004 may follow the direction field 1002, and may indicate the wavelength selection scheme or algorithm that may be used to assign a wavelength over a link. The wavelength may be assigned using the wavelength selection scheme based on criteria such as wavelength availability or wavelength usage. Specifically, the wavelength assignment method may be unspecified, a first-fit wavelength assignment method that may assign a first wavelength in a list of available wavelengths, a random wavelength assignment method that may assign a random wavelength in a list of available wavelengths, or a least loaded wavelength assignment method that may assign a wavelength having a largest or maximum number of available or unassigned links in a list of wavelengths. For instance, the wavelength assignment method field 1004 may be set to zero to indicate an unspecified wavelength assignment method, to one to indicate a first-fit wavelength assignment method, to two to indicate a random wavelength assignment method, or to three to indicate a least loaded wavelength assignment method. In some embodiments, the wavelength assignment field 1004 may be set to four to indicate a most used wavelength assignment method, which may assign a wavelength having a largest or maximum number of assigned or used links in a list of wavelengths. The reserved field 1006 may follow the wavelength assignment method field 1004, and may be used for other purposes.

Figure 11:
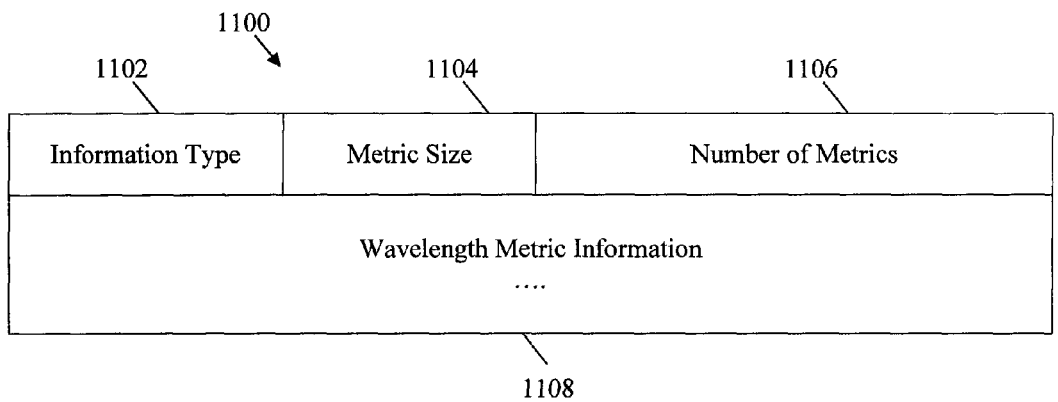
FIG. 11 is a schematic diagram of an embodiment of a supplemental wavelength assignment information TLV.

FIG. 11 illustrates an embodiment of a supplemental wavelength assignment information TLV 1100, which may be used to carry supplemental wavelength assignment information between a plurality of NEs along a path. The supplemental wavelength assignment information may be required to implement some wavelength assignment methods, such as a least loaded wavelength assignment method. The supplemental wavelength assignment information TLV 1100 may comprise an information type field 1102, a metric size field 1104, a number of metrics field 1106, at least one wavelength metric information field 1108, or combinations thereof.

The information type field 1102 may be used to specify whether a wavelength metric in the wavelength metric information field 1108 comprises a single value for a plurality of wavelengths, or a plurality of values for each of the wavelengths. For instance, the information type field 1102 may be set to zero to indicate that the wavelength metric comprises a single value, or the information type field 1102 may be set to one to indicate that the wavelength metric comprises a plurality of values. The metric size field 1104 may follow the information type field 1102, and may be used to specify the size of the wavelength metric in the wavelength metric information field 1108. For instance, the metric size field 1104 may be set to zero to indicate that the wavelength metric is about eight bits long, the metric size field 1104 may be set to one to indicate that the wavelength metric is about 16 bits long, or the metric size field 1104 may be set to two to indicate that the wavelength metric is about 32 bits long. The number of metrics field 1106 may follow the metric size field 1104, and may be used to specify the number of wavelength metrics included in the supplemental wavelength assignment information TLV 1100. In an embodiment, the information type field 1102 and the metric size field 1104 may each be about eight bits long, while the number of metrics field 1106 may be about 16 bits long.

The wavelength metric information field 1108 may comprise the wavelength metric, which may specify at least one value or assignment associated with a wavelength or wavelength channel. The value or assignment may be used in a wavelength assignment method to select or assign a wavelength. Further, the wavelength metric size or format may vary depending on the wavelength assignment method associated with the supplemental wavelength assignment information. In an embodiment, the wavelength metric may be about eight bits long, about 16 bits long, or about 32 bits long.

Figure 12:
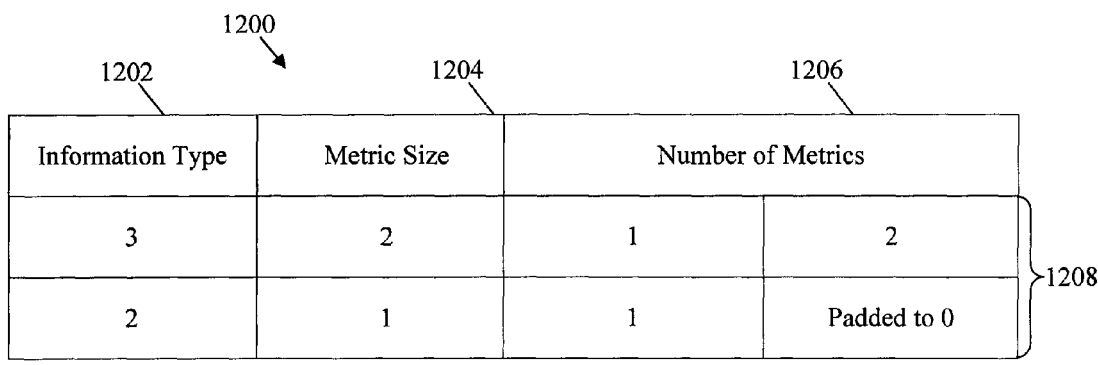
FIG. 12 is a schematic diagram of another embodiment of a supplemental wavelength assignment information TLV.

FIG. 12 illustrates another embodiment of a supplemental wavelength assignment information TLV 1200, which may be used to represent supplemental wavelength assignment information associated with a least loaded wavelength assignment. The supplemental wavelength assignment information TLV 1200 may comprise an information type field 1202, a metric size field 1204, a number of metrics field 1206, a wavelength metric information field 1208, or combinations thereof. The information type field 1202 and the metric size field 1204 may be similar to the corresponding fields of the wavelength set TLV 1200.

The supplemental wavelength assignment information TLV 1200 may be used to indicate wavelength availability information for a plurality of wavelength channels. For instance, the wavelength availability information may comprise the number of available or unassigned links or fibers for at least some of the wavelength channels. In a least loaded or most used wavelength assignment scheme, such wavelength availability information may be used to select or assign an available wavelength channel, which may have the maximum or largest number of available links. In an embodiment, the wavelength metric information fields 1208 may comprise such wavelength availability information. Specifically, the wavelength metric of the wavelength metric information field 1208 may comprise a number of available or unassigned links or fibers for each of the available wavelengths. Additionally, the information type field 1202 may be set to one to indicate that the wavelength metric represents a list of values.

For example, the wavelength metric information field 1208 may comprise the numbers of available links corresponding to the wavelengths or frequencies for the DWDM system represented by the wavelength set TLV 600, shown in FIG. 6. Accordingly, the wavelength metric information field 1208 may comprise a first value set equal to three, which is the number of available links corresponding to the first frequency, e.g. 192.0 THz, of the first available DWDM channel. Similarly, the wavelength metric information field 1208 may comprise a second value, which indicates that the second frequency, e.g. 192.5 THz, of the second available DWDM channel has two available links. The wavelength metric information field 1208 may comprise a third value, which indicates that the third frequency, e.g. 193.1 THz, of the third available DWDM channel has one available link. The wavelength metric information field 1208 may comprise a fourth value, which indicates that the fourth frequency, e.g. 193.8 THz, of the fourth available DWDM channel has two available links. The wavelength metric information field 1208 may comprise a fifth value, which indicates that the fifth frequency, e.g. 194.0 THz, of the fifth available DWDM channel has two available links. The wavelength metric information field 1208 may comprise a six wavelength metric, which indicates that the sixth frequency, e.g. 195.2 THz, of the sixth available DWDM channel has one available link. The wavelength metric information field 1208 may comprise a last seventh value, which indicates that the seventh frequency, e.g. 195.8 THz, of the seventh available DWDM channel has one available link. In an embodiment, the wavelength metric information field 1208 may be about 64 bits long and may comprise seven values, which may be each about 8 bits long.

Hence, the remaining eight bits of the wavelength metric information field 1208 may be padded and set to zero.

Figure 13:
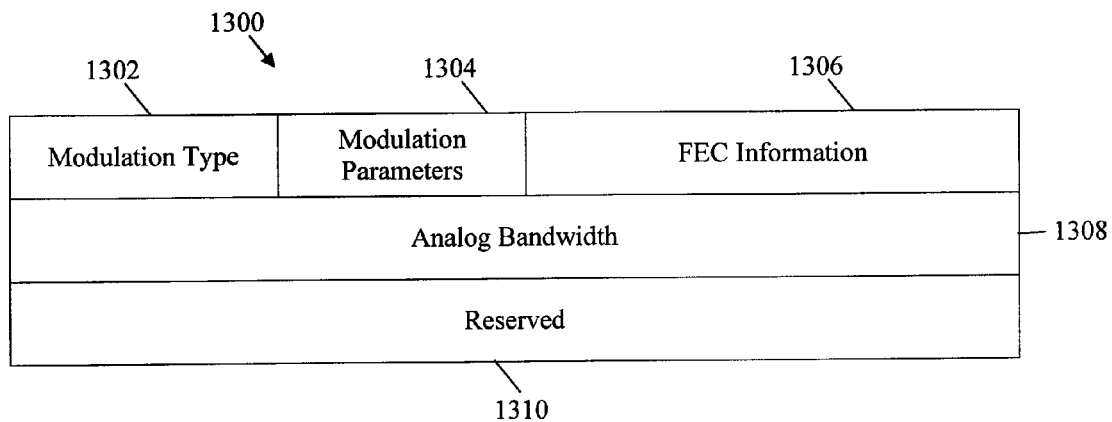
FIG. 13 is a schematic diagram of an embodiment of a traffic parameter TLV.

FIG. 13 illustrates an embodiment of a traffic parameter TLV 1300, which may be used to forward a traffic parameter between a plurality of NEs along a path. The traffic parameter may be used to represent a transmission property, such as modulation or bandwidth, for an optical signal that may be assigned a wavelength. Specifically, the traffic parameter TLV 1300 may comprise a modulation type field 1302, a modulation parameter field 1304, a forward error correction (FEC) information field 1306, an analog bandwidth field 1308, a reserved field 1310, or combinations thereof. In an embodiment, the modulation type field 1302 and the modulation parameter field 1304 may each be about eight bits long, the FEC information field 1306 may be about 16 bits long, and the analog bandwidth field 1308 and the reserved field 1310 may each be about 32 bits long.

The modulation type field 1302 may indicate the optical signals' modulation scheme. For instance, the modulation type field 1302 may be set to zero when the optical signal modulation scheme is unspecified or unknown. Alternatively, the modulation type field 1302 may be set to one when the optical signals' modulation scheme is a non-return-to-zero (NRZ) modulation or to two when the optical signals' modulation scheme is a return-to-zero (RZ) modulation. The modulation parameter field 1304 may be used to represent parameters or characteristics that are specific to each modulation scheme. For instance, when the modulation type field 1302 indicates an NRZ optical signal modulation, the modulation parameter field 1304 may be used to specify the duty cycle for modulation. As such, the modulation parameter 1304 may be set to zero to indicate an NRZ modulation at about 33 percent duty cycle, to one to indicate an NRZ modulation at about 50 percent duty cycle, or to two to indicate an NRZ modulation at about 66 percent duty cycle. For some modulation schemes, such as NR modulation, the modulation parameter 1304 may not be used. The FEC information field 1306 may identify the coding scheme used for FEC. For example, the FEC information field 1306 may be set to zero to indicate no FEC coding, to one to indicate a first FEC coding, to two to indicate a second FEC coding, etc. The analog bandwidth field 1308 may be used to represent the optical signals analog bandwidth around a center frequency, such as a 3 decibel (dB) power bandwidth. For instance, when the modulation type field 1302 is set to zero to indicate an unspecified modulation scheme, the analog bandwidth field 1308 may be used to specify the analog bandwidth of the optical signal.

Figure 14:
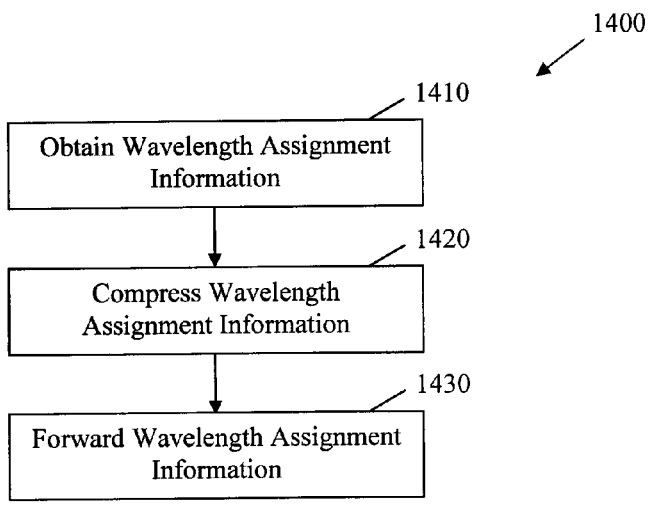
FIG. 14 is a schematic diagram of an embodiment of a wavelength assignment information forwarding method.

FIG. 14 illustrates an embodiment of a wavelength assignment information processing method 1400, which may be implemented to obtain wavelength assignment information, compress or represent the wavelength assignment information, and forward the wavelength assignment information to an NE along a path. The wavelength availability information may be forwarded via signaling or messaging and may be used for distributed wavelength assignment between a pluralities of NEs.

At block 1410, the method 1400 may obtain the wavelength assignment information. In an embodiment, the method 1400 may obtain at least a wavelength set, a wavelength assignment method selection, a supplemental wavelength assignment information, a traffic parameter, or combinations thereof. The method 1400 may obtain the wavelength set by receiving at least an available wavelength, an assigned wavelength, or both, at a local or remote NE. Additionally, the method 1400 may receive a channel spacing for a plurality of wavelength channels, a predetermined center frequency, or both. The method 1400 may obtain a wavelength assignment method selection by receiving a wavelength assignment direction, a wavelength assignment scheme type, or both. The method 1400 may obtain a supplemental wavelength assignment information by receiving a number of links available for at least a wavelength channel, a number of links assigned for at least a wavelength channel, or both. The method 1400 may obtain a traffic parameter by receiving a signal modulation type, a modulation duty cycle, a signal bandwidth, an FEC coding information, or combinations thereof. The method 1400 may then proceed to block 1420.

At block 1420, the method 1400 may compress or represent the wavelength assignment information. In an embodiment, the method 1400 may compress the wavelength set, the wavelength assignment method selection, the supplemental wavelength assignment information, the traffic parameter, or combinations thereof. The method 1400 may compress the wavelength set by representing at least an available wavelength, at least an assigned wavelength, or both by a number of wavelengths and the channel spacing, by a wavelength offset and a sign with respect to the predetermined center frequency, or by a wavelength bitmap. Additionally, the method 1400 may indicate the format used to represent the wavelength set by an action type or integer and a grid specification.

The method may compress the wavelength assignment method selection by representing the wavelength assignment direction by a direction type and the wavelength assignment scheme by a wavelength assignment scheme type. The method 1400 may compress the supplemental wavelength assignment information by representing the number of available links for at least a wavelength channel, the number of assigned links for at least a wavelength channel, or both by a wavelength metric, a metric size, and a number of metrics. Additionally, the method 1400 may indicate whether the wavelength metric is associated with one or a plurality of wavelength channels by an information type. The method 1400 may compress the traffic parameter by representing the signal modulation type by a signal modulation type and the modulation duty cycle by a signal modulation parameter type. The method 1400 may then proceed to block 1430.

At block 1430, the method 1400 may forward the wavelength assignment information. In an embodiment, the method 1400 may forward the wavelength set using a wavelength set TLV or field, the wavelength assignment method selection using a wavelength assignment method selection TLV or field, the supplemental wavelength assignment information using a supplemental wavelength assignment information, the traffic parameter using a traffic parameter TLV or field, or combinations thereof. In an embodiment, the method 1400 may forward the wavelength set by forwarding the number of wavelengths, the channel spacing, the wavelength offsets, the signs, the wavelength bitmap, the action id, or combinations thereof, using separate TLVs or fields. The method 1400 may forward the wavelength assignment method selection by forwarding the direction type and the wavelength assignment scheme type using separate TLVs or fields. The method 1400 may forward the supplemental wavelength assignment information by forwarding the wavelength metric, the metric size, the number of metrics, the information type, or combinations thereof, using separate TLVs or fields. The method 1400 may forward the traffic parameter by forwarding the signal modulation type and the signal modulation parameter type using separate TLVs or fields.

Figure 15:
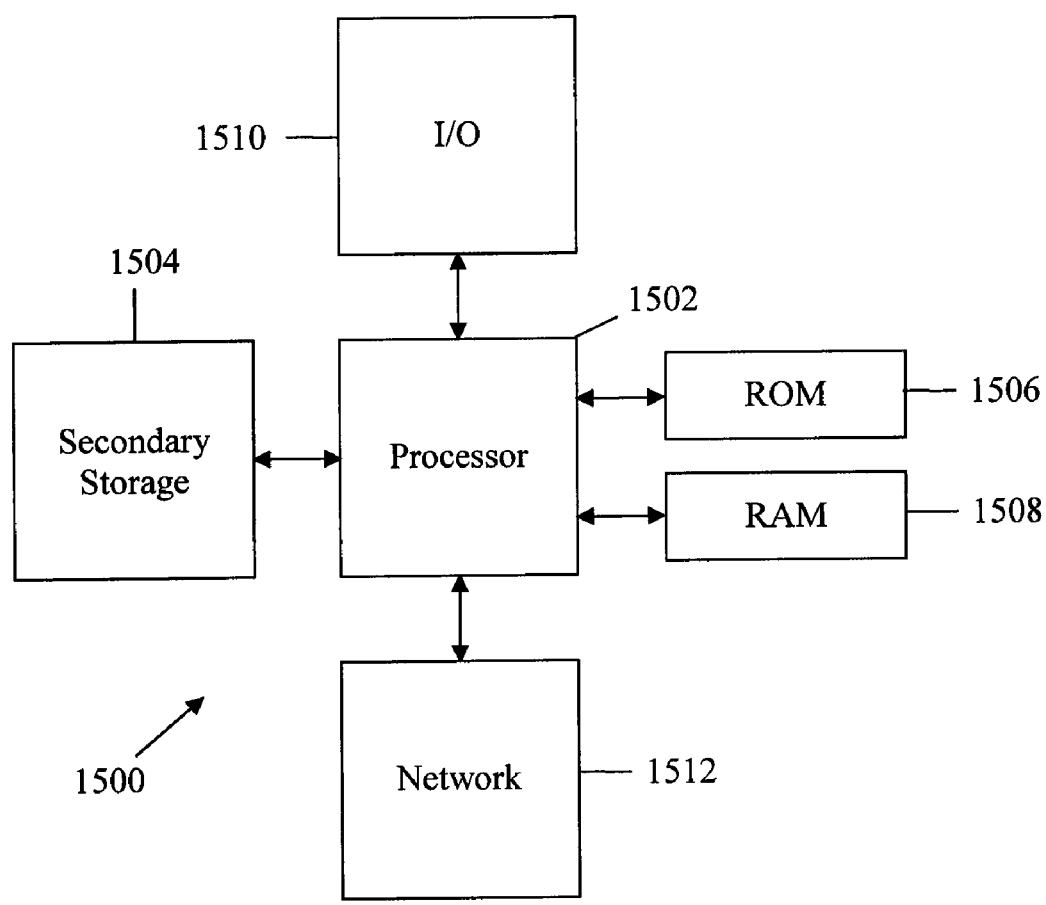
FIG. 15 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 15 illustrates a typical, general-purpose network component 1500 suitable for implementing one or more embodiments of the components disclosed herein. The network component 1500 includes a processor 1502 (which may be referred to as a central processor unit or CPU) that is in communication with memory devices including secondary storage 1504, read only memory (ROM) 1506, random access memory (RAM) 1508, input/output (I/O) devices 1510, and network connectivity devices 1512. The processor 1502 may be implemented as one or more CPU chips, or may be part of one or more application specific integrated circuits (ASICs).

The secondary storage 1504 is typically comprised of one or more disk drives or tape drives and is used for non-volatile storage of data and as an over-flow data storage device if RAM 1508 is not large enough to hold all working data. Secondary storage 1504 may be used to store programs that are loaded into RAM 1508 when such programs are selected for execution. The ROM 1506 is used to store instructions and perhaps data that are read during program execution. ROM 1506 is a non-volatile memory device that typically has a small memory capacity relative to the larger memory capacity of secondary storage 1504. The RAM 1508 is used to store volatile data and perhaps to store instructions. Access to both ROM 1506 and RAM 1508 is typically faster than to secondary storage 1504.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
a first node configured to forward a wavelength assignment message to a second node, wherein the wavelength assignment message comprises a wavelength assignment method selection type-length-value (TLV) that comprises a direction field and a wavelength assignment method field.

2. The apparatus of claim 1, wherein the wavelength assignment message further comprises a wavelength set TLV that comprises an action field, an application field, a number of wavelengths field, and a lambda label.

3. The apparatus of claim 2, wherein the wavelength set TLV represents a set of wavelengths, and wherein the action field is configured to selectively designate use of an inclusive wavelength list, use of an exclusive wavelength list, use of an inclusive wavelength range, use of an exclusive wavelength range, and use of at least one bitmap for the set of wavelengths.

4. The apparatus of claim 1, wherein the wavelength assignment message further comprises a supplemental wavelength assignment information TLV that comprises an information type field, a metric size field, a number of metrics field, and at least one wavelength metric information field.

5. The apparatus of claim 1, wherein the wavelength assignment message further comprises a traffic parameter TLV that comprises a modulation type field, a modulation parameter field, a forward error correction (FEC) information field, and an analog bandwidth field, and wherein the traffic parameter TLV indicates selection of one of multiple predetermined modulation options and selection of one of multiple predetermined FEC options.

6. A network component comprising:
 at least one processor configured to communicate with a computer-readable medium that is configured to store instructions that, when executed, cause the processor to:
 obtain traffic parameter data; and
 use at least one type-length-value (TLV) to represent the obtained traffic parameter data,
 wherein traffic parameter data is represented in the TLV using a modulation type field that designates one of multiple modulation options and uses a forward error correction (FEC) information field to designate one of multiple FEC options, and
 wherein the TLV further comprises wavelength set data that is represented in the TLV by setting an action field value and providing a set of wavelengths, wherein a first action field value designates that the set of wavelengths corresponds to an inclusive wavelength list, a second action field value designates that the set of wavelengths corresponds to an exclusive wavelength list, a third action field value designates that the set of wavelengths corresponds to an inclusive wavelength range, a fourth action field value designates that the set of wavelengths corresponds to an exclusive wavelength range, and a fifth action field value designates use of a bit map to indicate the set of wavelengths.

7. A network component comprising:
 at least one processor configured to communicate with a computer-readable medium that is configured to store instructions that, when executed, cause the processor to:
 obtain traffic parameter data; and
 use at least one type-length-value (TLV) to represent the obtained traffic parameter data,
 wherein traffic parameter data is represented in the TLV using a modulation type field that designates one of multiple modulation options and uses a forward error correction (FEC) information field to designate one of multiple FEC options, and
 wherein the TLV further comprises wavelength assignment method selection data that is represented in the TLV by setting a direction field to a first value when a wavelength assignment is unidirectional and setting the direction field to a second value when the wavelength assignment is bidirectional.

8. A network component comprising:
 at least one processor configured to communicate with a computer-readable medium that is configured to store instructions that, when executed, cause the processor to:
 obtain traffic parameter data; and
 use at least one type-length-value (TLV) to represent the obtained traffic parameter data,
 wherein traffic parameter data is represented in the TLV using a modulation type field that designates one of multiple modulation options and uses a forward error correction (FEC) information field to designate one of multiple FEC options, and
 wherein the TLV further comprises wavelength assignment method selection data that is represented in the TLV by setting a wavelength assignment method field value to a first value when the wavelength assignment method is an unspecified wavelength assignment method, setting the wavelength assignment method field value to a second value when the wavelength assignment method is a first-fit wavelength assignment method, setting the wavelength assignment method field value to a third value when the wavelength assignment method is a random wavelength assignment method, and setting the wavelength assignment method field value to a fourth value when the wavelength assignment method is a least loaded wavelength assignment method.

9. A network component comprising:
 at least one processor configured to communicate with a computer-readable medium that is configured to store instructions that, when executed, cause the processor to:
 obtain traffic parameter data; and
 use at least one type-length-value (TLV) to represent the obtained traffic parameter data,
 wherein traffic parameter data is represented in the TLV using a modulation type field that designates one of multiple modulation options and uses a forward error correction (FEC) information field to designate one of multiple FEC options, and
 wherein the TLV further comprises supplemental wavelength assignment data that is represented in the TLV by setting an information field value to a first value when the supplemental wavelength assignment data comprises a wavelength metric used to determine whether to assign collectively all wavelengths and by setting the information field value to a second value when the supplemental wavelength assignment data comprises a wavelength metric used to determine whether to assign individually each wavelength in a group.

10. The network component of claim 9, wherein the supplemental wavelength assignment data is further represented in the TLV by setting a metric size field value to a first value when the wavelength metric is about eight bits long, setting metric size field value to a second value when the wavelength metric is about 16 bits long, and metric size field value to a third value when the wavelength metric is about 32 bits long.

11. A network component comprising:
 at least one processor configured to communicate with a computer-readable medium that is configured to store instructions that, when executed, cause the processor to:
 obtain traffic parameter data; and
 use at least one type-length-value (TLV) to represent the obtained traffic parameter data,
 wherein traffic parameter data is represented in the TLV using a modulation type field that designates one of multiple modulation options and uses a forward error correction (FEC) information field to designate one of multiple FEC options, and
 wherein the traffic parameter data is further represented in the TLV by setting a modulation type field value to a first value when the traffic parameter data corresponds to a signal with an unspecified or unknown modulation, setting the modulation type field value to a second value when the traffic parameter data corresponds to a signal with a non-return-to-zero modulation, and setting the modulation type field value to a third value when the traffic parameter data corresponds to a signal with a return-to-zero modulation.

12. The network component of claim 11, wherein the traffic parameter data is represented in the TLV by setting a modulation parameter field value to a first value when the modulation type field value is set to said second value and the non-return-to-zero modulation comprises a duty cycle of about 33 percent, setting the modulation parameter field value to a second value when the modulation type field value is set to said second value and the non-return-to-zero modulation comprises a duty cycle of about 50 percent, and setting the modulation parameter field value to a third value when the modulation type field value is set to said second value and the non-return-to-zero modulation comprises a duty cycle of about 66 percent.

13. A method comprising:
obtaining wavelength assignment information comprising a wavelength assignment method selection; and
forwarding the wavelength assignment information along a path,
wherein the wavelength assignment method selection comprises a directionality indicator.

14. The method of claim 13, wherein a wavelength set is included with the wavelength assignment information and comprises a lambda label and at least one number of wavelengths that indicates a plurality of wavelengths, wherein a supplemental wavelength assignment information is included with the wavelength assignment information and comprises a wavelength metric that indicates whether to assign the wavelengths, and wherein the wavelength assignment method selection comprises a method type that indicates an algorithm for assigning the wavelengths based on the wavelength metric.

15. The method of claim 14, wherein the wavelengths are unassigned wavelengths, the wavelength metric is a least loaded vector comprising a plurality of assigned channels for each wavelength, and the algorithm is a least loaded wavelength assignment that assigns the wavelength with the least assigned channels.

16. The method of claim 14, wherein the lambda label is associated with a predetermined center frequency and comprises a channel spacing, a sign, and a number for a lowest frequency.

17. The method of claim 16, wherein the lambda label indicates one of the wavelengths having a frequency equal to a sum of the predetermined center frequency and a product of the channel spacing, the sign, and the number for the lowest frequency.

18. The method of claim 13, wherein a traffic parameter is included with the wavelength assignment information and comprises analog bandwidth information that indicates a bandwidth around a center frequency corresponding to a traffic signal with an unspecified or unknown modulation.

19. A method comprising:
transmitting a type-length-value (TLV) that is used to indicate a wavelength assignment directionality and a wavelength assignment method,
wherein the TLV comprises a wavelength field that when set to zero indicates the same wavelength is used in both directions and when set to one indicates that different wavelengths are used in the two directions, and
wherein the TLV comprises a wavelength assignment method field that when set to zero indicates that the wavelength assignment method is unspecified, when set to one indicates that the wavelength assignment method is first-fit, when set to two indicates that the wavelength assignment method is random, and when set to three indicates that the wavelength assignment method is least-loaded.

* * * * *

UNITED STATES PATENT AND TRADEMARK OFFICE
CERTIFICATE OF CORRECTION

| | | |
|---|---|---|
| PATENT NO. | : 8,208,808 B2 | Page 1 of 1 |
| APPLICATION NO. | : 12/186775 | |
| DATED | : June 26, 2012 | |
| INVENTOR(S) | : Greg Bernstein and Young Lee | |

It is certified that error appears in the above-identified patent and that said Letters Patent is hereby corrected as shown below:

On the Title Page: column 2, Item (74), line 2, "Rudolph" should read "Rodolph"

Signed and Sealed this
Eleventh Day of September, 2012

David J. Kappos
*Director of the United States Patent and Trademark Office*